US006637306B2

(12) United States Patent
Miyano (10) Patent No.: US 6,637,306 B2
(45) Date of Patent: Oct. 28, 2003

(54) LATHE ASSEMBLY AND METHOD OF OPERATING THE LATHE ASSEMBLY

(76) Inventor: Toshiharu Tom Miyano, c/o Miyano Machinery USA Inc., 940 N. Central Ave., Wood Dale, IL (US) 60191

( * ) Notice: Subject to any disclaimer, the term of this patent is extended or adjusted under 35 U.S.C. 154(b) by 0 days.

(21) Appl. No.: 10/237,838

(22) Filed: Sep. 9, 2002

(65) Prior Publication Data

US 2003/0005799 A1 Jan. 9, 2003

Related U.S. Application Data

(62) Division of application No. 09/378,645, filed on Aug. 20, 1999, now Pat. No. 6,446,533.

(51) Int. Cl.[7] .............................. B23B 13/00; B23B 1/00
(52) U.S. Cl. ............................... 82/127; 82/162; 82/170
(58) Field of Search .......................... 82/127, 117, 118, 82/120, 121, 126, 124, 129, 132, 133, 162, 165, 170, 173

(56) References Cited

U.S. PATENT DOCUMENTS

| | | | | |
|---|---|---|---|---|
| 3,693,810 A | * | 9/1972 | Gumhold | 414/18 |
| 4,655,654 A | * | 4/1987 | Portas | 409/220 |
| 5,152,201 A | * | 10/1992 | Izawa | 82/1.11 |
| 5,165,313 A | * | 11/1992 | Karr | 82/127 |
| 5,904,082 A | * | 5/1999 | Link et al. | 82/129 |

FOREIGN PATENT DOCUMENTS

JP  56-146602 A  * 11/1981

* cited by examiner

Primary Examiner—Henry W. H. Tsai
(74) Attorney, Agent, or Firm—Wood, Phillips, Katz, Clark & Mortimer (57) ABSTRACT

A lathe assembly having a guide with a passageway for movement of a piece of bar stock, with a leading end and a trailing end, in a substantially straight path between a feeding position and a working position. A sensor assembly is capable of detecting the position of the trailing end of a piece of bar stock within the guide passageway to thereby allow a user to determine if a piece of bar stock in the guide passageway has a length sufficient to perform the desired operation thereon. Also, a method of using the lathe assembly.

21 Claims, 4 Drawing Sheets

LATHE ASSEMBLY AND METHOD OF OPERATING THE LATHE ASSEMBLY

CROSS-REFERENCE

This application is a division of application Ser. No. 09/378,645, filed Aug. 20, 1999, entitled "Lathe Assembly and Method of Using a Lathe Assembly", now U.S. Pat. No. 6,446,533.

BACKGROUND OF THE INVENTION

1. Field of the Invention

This invention relates to lathe assemblies and, more particularly, to a lathe assembly which performs a machining operation on a piece of bar stock. The invention is also directed to a method of using a lathe assembly.

2. Background Art

It is known to feed bar stock to a tool assembly and to machine the bar stock in successive machining operations to produce multiple, finished workpieces from a single piece of the bar stock. In FIGS. 1–5 herein, a conventional lathe assembly is shown at 10 for operating in this manner upon individual pieces 12 of bar stock.

Figures 2, 3, 4, 5, 6:
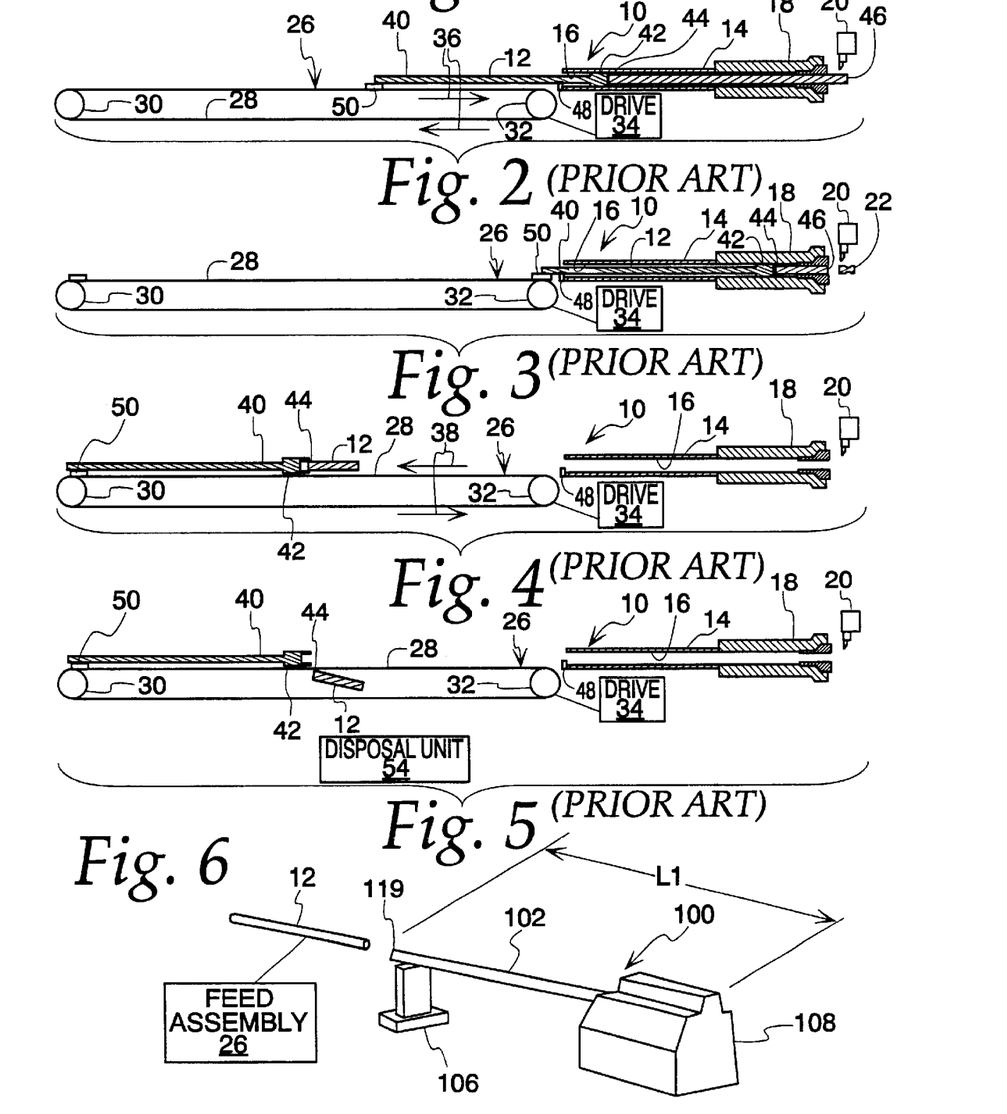
FIG. 2 is a view as in FIG. 1 with the feed assembly operated to advance the piece of bar stock through the guide passageway and spindle to a working position wherein it is exposed to be machined by the tool assembly.
FIG. 3 is a view as in FIG. 2 showing the piece of bar stock further advanced and with a workpiece formed and cut from the end of the piece of bar stock.
FIG. 4 is a view as in FIG. 3 wherein the feed assembly is operated to withdraw the remaining portion of the piece of bar stock from the spindle and guide passageway.
FIG. 5 is a view as in FIG. 4 with the remaining piece of bar stock being deposited in a disposal unit.
FIG. 6 is a schematic, perspective view of a lathe assembly according to the present invention.

The lathe assembly 10 consists of a guide 14 defining a passageway 16 within which the individual pieces 12 of bar stock can be guidingly moved selectively towards and away from a spindle 18. Through the spindle 18, the pieces 12 of bar stock can be held in a working position, as shown in FIG. 2, and rotated. A tool assembly 20 performs machining operations on the pieces 12 of bar stock in the working position to produce individual workpieces 22.

The pieces 12 of bar stock are delivered to the passageway 16 from a supply location at 24 through a feed assembly 26. The feed assembly 26 consists of an endless chain conveyor 28 which is trained around spaced pulleys 30, 32. Through a drive 34, the pulley 32 is rotated selectively in a forward direction, as indicated by the arrows 36 in FIG. 2, and a reverse direction, as indicated by the arrows 38 in FIG. 4.

A push rod 40 is attached to the upper surface of the chain conveyor 28 and is movable from left to right, with the drive 34 operated to rotate the pulley 32 in the forward direction, and from right to left, with the drive 34 operated to rotate the pulley 32 in the reverse direction. The push rod 40 has a receiver 42 at an end thereof to grip the trailing ends 44 of the pieces 12 of bar stock.

Figure 1:
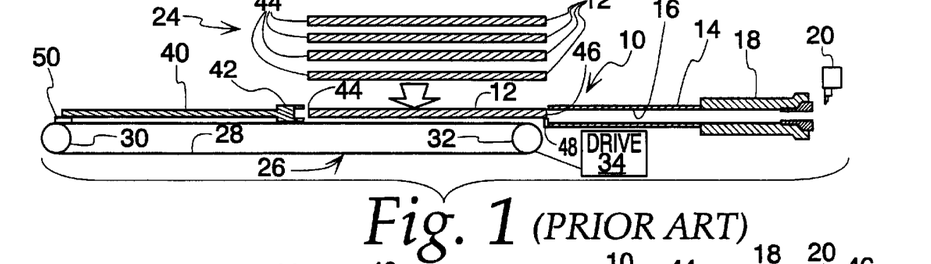
FIG. 1 is a schematic, cross-sectional view of a prior art lathe assembly including a feed assembly for directing pieces of bar stock through a guide passageway to a spindle to be held thereby for operation by a tool assembly and with one of the pieces of bar stock placed on the feed assembly.

In operation, the pieces 12 of bar stock are delivered one-by-one from the supply location 24 to the top surface of the chain conveyor 28 with the push rod 40 retracted to the FIG. 1 position. The drive 32 is then activated to rotate the pulley 32 in the forward direction which causes the receiver 42 to advance from left to right and engage the trailing end 44 of the active piece 12 of bar stock. Continued operation of the drive 34 causes the leading end 46 of the active piece 12 of bar stock to be directed into and through the passageway 16 and spindle 18 to be exposed outside of the spindle 18, as shown in FIG. 2, for operation thereon by the tool assembly 20 to thereby produce a workpiece 22.

The drive 34 is incrementally operated to advance the active piece 12 of bar stock a distance equal to a predetermined length dimension for the workpiece 22. Eventually, the length of the active piece 12 of bar stock is diminished to less than the predetermined length of the workpiece 22 that is to be produced. Attempting to machine the remaining piece 12 of bar stock that is shorter than the predetermined length of the workpiece 22 could cause jamming and, in any event, is a wasted step given that the machined workpiece 22 would have to be sorted and discarded.

To avoid the above situation, it is known to use a proximity sensor 48 which detects an element 50 at the trailing end 44 of the active piece 12 of bar stock. The element 50 is strategically situated so that the proximity sensor 48 detects the element 50 once the active piece 12 of bar stock has been reduced to a length less than that necessary to form the workpiece 22. After the last possible workpiece 22 is formed, the sensor detects the element 50 and causes a signal to be generated that causes the drive 32 to thereby retract the remaining piece 12 of bar stock from the passageway 16 and release it to a disposal unit 54, as shown in FIG. 5.

The horizontal arrangement of the guide 14 is typical of conventional lathe assemblies. One problem with this horizontal arrangement is that, with very long workpieces, a significant amount of floor space may be required to operate the lathe assembly.

While it is known to vertically orient elongate workpieces held in a vertically opening chuck on lathe assemblies, the problem of chip buildup on the workpiece and chuck must be contended with.

Figures 12, 13:
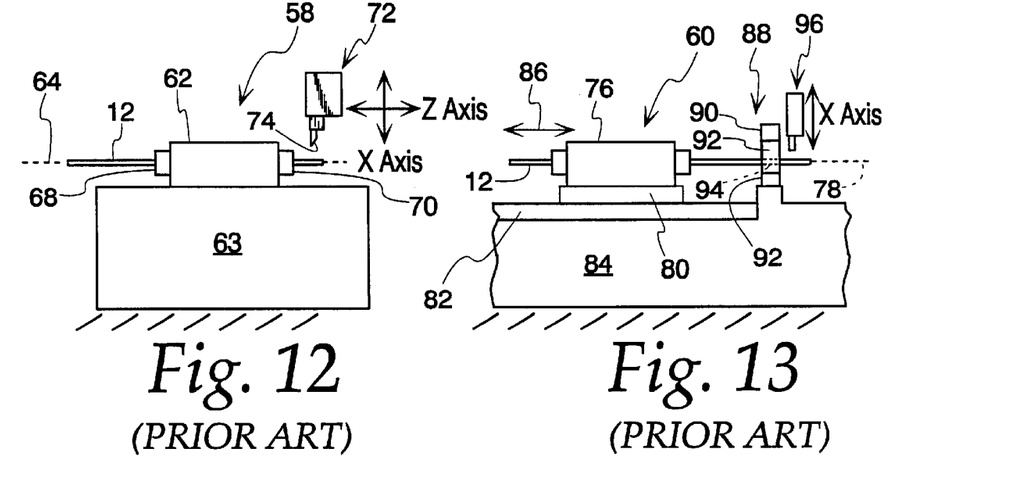
FIG. 12 is a schematic, side elevation view of a conventional lathe assembly having a fixed spindle.
FIG. 13 is a side elevation view of a conventional lathe assembly having a slidable spindle.

In FIGS. 12 and 13, two additional prior art lathe assemblies are shown at 58 and 60, respectively. The lathe assembly 58 is characterized as a fixed spindle lathe assembly with there being a spindle 62 thereon, fixedly attached to a frame 63 and having a horizontal central axis 64. An elongate piece 12 of bar stock is advanced from an input end 68 of the spindle 62 through the spindle 62 to and through an output end 70 at which the piece 12 of bar stock is exposed to be machined by a tool assembly 72. The tool assembly 72 is selectively movable along X and Z axes to allow a tool element 74 on the tool assembly 72 to operate on the piece 12 of bar stock held and rotated by the spindle 62.

The lathe assembly 60 is characterized as a sliding spindle lathe assembly and includes a spindle 76 with a horizontal central axis 78. The spindle 76 has an adaptor 80 which cooperates with, and is guided along, a rail 82 on a frame 84 so as to allow the spindle 76 to move in the line of the double-headed arrow 86 parallel to the central axis 78 of the spindle 76.

In the lathe assembly 60, a bushing assembly 88 is provided with a body 90 and a bushing 92 having an opening 94 therethrough. The spindle axis 78 is coincident with the central axis for the bushing opening 94. The bushing assembly 88 serves as a support to rigidify the end of the piece 12 of bar stock that is being machined by a tool assembly 96.

Typically, both of the lathe assemblies 58, 60 are designed for relatively small diameter pieces 12 of bar stock. It is conventional to make dedicated machines that function either as a fixed spindle lathe assembly, such as the lathe assembly 58, or as a sliding spindle lathe assembly, such as the lathe assembly 60.

SUMMARY OF THE INVENTION

The invention is directed to a lathe assembly having a guide with a passageway for movement of a piece of bar stock, with a leading end and a trailing end, in a substantially straight path between a feeding position and a working position. A sensor assembly is capable of detecting the position of the trailing end of a piece of bar stock within the guide passageway to thereby allow a user to determine if a piece of bar stock in the guide passageway has a length sufficient to perform a desired operation thereon.

The lathe assembly may further include a spindle for releasably holding a piece of bar stock in the working position.

The sensor assembly may have a generator for a signal indicative that a piece of bar stock in the guide passageway has less than a predetermined length.

The lathe assembly may further include a tool assembly to perform an operation on a piece of bar stock in the working position.

The sensor assembly may include a generator for a stop signal indicative that a piece of bar stock in the guide passageway has less than the predetermined length. The lathe assembly may further include a control to receive the stop signal and, in response thereto, prevent performance of an operation by the tool assembly on a piece bar stock in the passageway.

The sensor assembly may include an elongate element that can be directed into the guide passageway to against the trailing end of a piece of bar stock in the passageway to thereby determine whether a piece of bar stock in the guide passageway is less than or greater than the predetermined length.

The sensor assembly may include a generator for a beam to be directed against the trailing end of a piece of bar stock in the guide passageway and reflected therefrom and a receiver for the reflected beam.

The generator may be a laser beam generator.

The lathe assembly may further include a piece of bar stock in the guide passageway.

The lathe assembly may still further include a drive to rotate a piece of bar stock in the working position in the guide passageway.

The tool assembly may include a tool element which acts against a piece of bar stock in the working position. The tool assembly may include a turret with a plurality of interchangeable tool elements.

In one form, the spindle has an axis and axially spaced input and output ends and the piece of bar stock in the working position projects from both the input and output ends of the spindle.

In one form, the passageway has a central axis and axially spaced first and second ends. The spindle is at the first axially spaced end and the second axially spaced end is open to allow introduction of a piece of bar stock into the guide passageway.

The invention is also directed to a method of operating a lathe assembly having a guide with a passageway with a central axis and axially spaced first and second ends, a spindle, and a tool assembly for performing an operation on a piece of bar stock having a length and leading and trailing ends. The method includes the steps of directing a piece of bar stock axially through the guide passageway in a first direction from a feeding position into a working position and directing an element into the guide passageway to detect the position of the trailing end of the piece of bar stock and thereby determine if the piece of bar stock in the guide passageway is less than or greater than the predetermined length.

The method may further include the step of performing an operation on the piece of bar stock with the tool assembly if it is determined that the piece of bar stock has at least the predetermined length.

The method may further include the step of advancing the piece of bar stock in the first direction after performing the operation and again directing the element into the guide passageway to detect the position of the trailing end of the piece of bar stock to again determine if the piece of bar stock in the guide passageway is less than or greater than the predetermined length.

The step of directing an element from the sensor into the guide passageway may involve the step of directing a laser beam into the guide passageway.

The step of directing an element from the sensor into the guide passageway may involve the step of directing an elongate element into the guide passageway.

The method may further include the steps of providing a sensor assembly, generating a stop signal from the sensor assembly indicative that the piece of bar stock has a length less than the predetermined length, and processing the stop signal so that no operation is performed by the tool assembly on the piece of bar stock in the guide passageway.

The invention is also directed to a lathe assembly with a guide having a passageway with a central axis for movement of a piece of bar stock with a leading end and trailing end in a substantially straight path substantially parallel to the central axis of the passageway between a feeding position and a working position, and a spindle for releasably holding a piece of bar stock in the working position and having a through opening with a central axis, an input end, and an output end. The guide is oriented so that the central axis of the passageway is not parallel to a horizontal support surface for the lathe assembly. The passageway and through opening are aligned so that the leading end of a piece of bar stock can move through the passageway to and through the through opening from the input end to the output end to project from the output end with a piece of bar stock in the working position.

The central axes of the passageway and through opening may be substantially parallel to each other and extend substantially orthogonally to a horizontal support surface for the lathe assembly.

In one form, the central axes of the passageway and through opening are substantially parallel to each other and are non-orthogonal to a horizontal support surface for the lathe assembly.

The lathe assembly may further include a tool assembly for performing an operation on a piece of bar stock in the working position.

The invention is also directed to a method of operating a lathe assembly with a guide having a passageway with a central axis and axially spaced first and second ends, a spindle with a through opening having a central axis, an input end and an output end, and a tool assembly for performing an operation on a piece of bar stock having a length, a leading end, and a trailing end. The method includes the steps of orienting the guide so that the central axis of the passageway is inclined relative to a horizontal support surface for the lathe assembly and so that the central axis of the passageway declines from the first end towards the second end of the passageway, directing the leading end of the piece of bar stock into and through the passageway in a first direction from the first end of the passageway towards the second end of the passageway, moving the leading end of the piece of bar stock in the first direction into and through the through opening to a working position wherein the leading end of the bar stock projects from the output end of the spindle, clamping the piece of bar stock in the working position in the spindle, and performing an operation on a portion of the piece of bar stock projecting from the output end of the through opening with the piece of bar stock in the working position.

The method may further include the steps of placing a plurality of pieces of bar stock, each having a length, in a storage position, with the lengths of the plurality of pieces of bar stock being substantially parallel to each other and substantially parallel to a horizontal surface supporting the lathe assembly, removing the plurality of workpieces of bar stock one-by-one from the storage position, and directing the plurality of pieces of bar stock one-by-one into the passageway.

The method may further include the steps of placing a plurality of pieces of bar stock each having a length in a storage position with the lengths of the plurality of pieces of bar stock being substantially parallel to each other and substantially non-parallel to a horizontal surface supporting the lathe assembly, removing the plurality of pieces of bar stock one-by-one from the storage position, and directing the plurality of pieces of bar stock one-by-one into the passageway.

The invention is further directed to a lathe assembly having a spindle for holding an elongate workpiece and having a central axis, and a guide assembly having a body and a guide bushing on the body having a first opening with a central axis. The spindle and guide assembly are selectively repositionable between a) a first relative position wherein the central axis of the spindle extends through the first guide bushing opening so that an elongate workpiece held by the spindle can be projected into the first guide bushing opening so that the guide bushing limits flexing of an elongate workpiece held by the spindle and b) a second relative position wherein the central axis of the spindle does not extend through the first guide bushing opening. The lathe assembly further includes a tool assembly for performing an operation on an elongate workpiece held by the spindle.

In one form, with the spindle and guide assembly in the first relative position, the central axis of the spindle is substantially coincident with the central axis of the first guide bushing opening.

The guide bushing may be rotatable relative to the guide assembly body around the central axis of the first guide bushing opening.

The lathe assembly may further be provided in combination with an elongate workpiece that is held by the spindle and projects into the first guide bushing opening with the spindle and guide assembly in the first relative position.

In one form, the guide assembly has a second opening in the body with a central axis and with the spindle and the guide assembly in the second relative position, the central axis of the spindle extends through the second opening.

In one form, the first guide bushing opening has a first diameter, and the second opening has a second diameter, and the first diameter is different than the second diameter.

The guide assembly may be translatable relative to the spindle as the spindle and guide assembly are repositioned between the first relative position and the second relative position.

The guide assembly may be rotatable about an axis relative to the spindle as the spindle and guide assembly are repositioned between the first relative position and the second relative position.

The spindle and guide assembly may be movable, one relative to the other, along a line substantially parallel to the central axis of the spindle.

In one form, the spindle is abuttable to the guide assembly to be supported by the guide assembly.

In one form, with the spindle and the guide assembly in the second relative position, the central axis of the spindle is substantially coincident with the central axis of the second opening.

DETAILED DESCRIPTION OF THE DRAWINGS

Referring initially to FIGS. 6–9, a lathe assembly, according to the present invention, is shown at 100. The lathe assembly 100 includes an elongate guide 102 with a central axis 104. The guide 102 is supported by axially spaced frame elements 106, 108, with the latter defining a housing for a spindle 110 and a tool assembly 112, which are operable to perform a machining operation on a piece 12 of bar stock held by the spindle 110. The tool assembly 112 is a turret-type having interchangeable, and selectively usable, tool elements 113.

Figure 7:
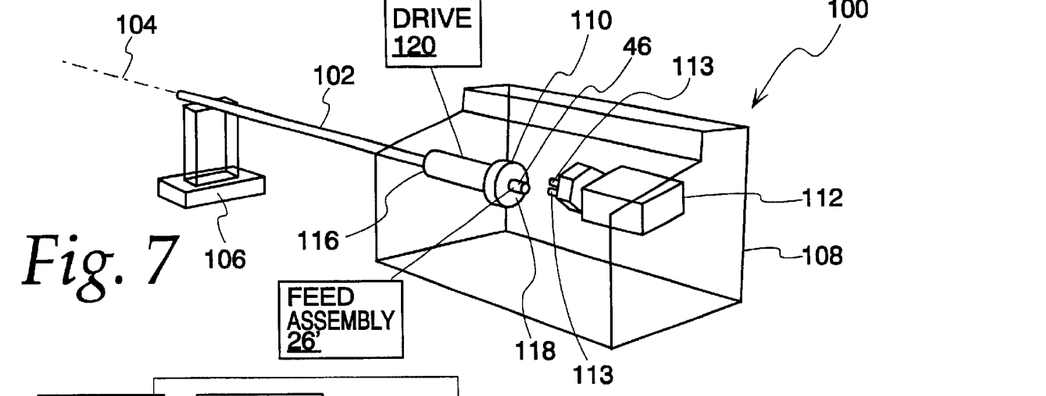
FIG. 7 is a view as in FIG. 6 showing a spindle and tool assembly on the lathe assembly.
Figure 8:
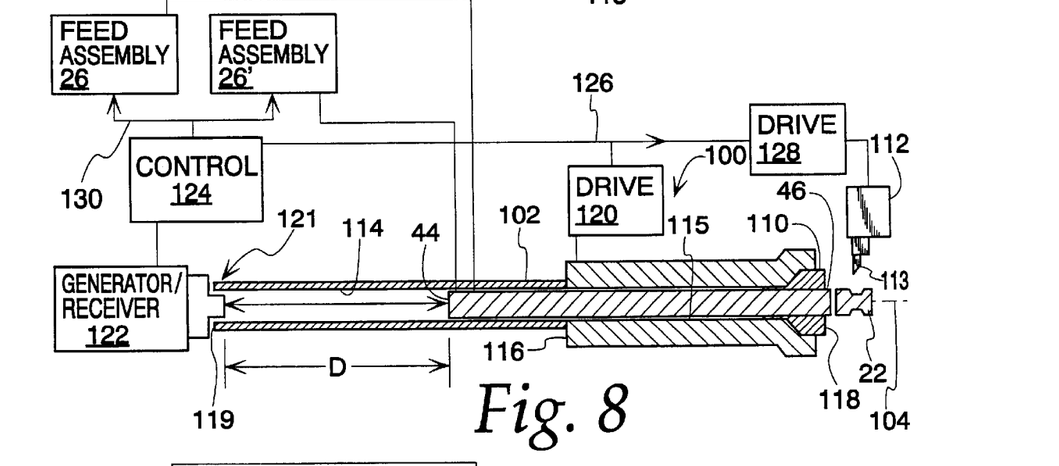
FIG. 8 is an enlarged, schematic, cross-sectional view of a guide defining a passageway, spindle, and a tool assembly for repositioning and advancing a piece of bar stock for operation thereon by a tool assembly on the inventive lathe assembly of FIGS. 6 and 7 and showing one type of structure, according to the present invention, for determining the remaining length of a piece of bar stock in the guide passageway.
Figure 9:
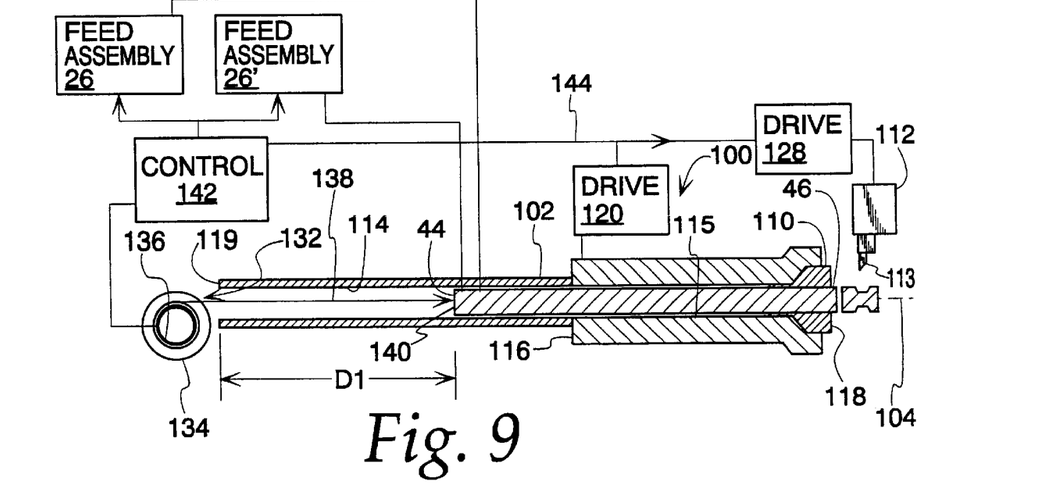
FIG. 9 is a view as in FIG. 8 showing another form of structure for determining the remaining length of a piece of bar stock in the guide passageway.

The guide 102 defines a passageway 114 through which pieces 12 of bar stock can be delivered from a feeding position, as shown in FIG. 6, in a straight path to a working position, as shown in FIGS. 7–9. The spindle 110 has a through opening 115 with an input end 116 and an output end 118. The through opening 115 and passageway 114 have coincident central axes. As a piece 12 of bar stock is moved from the feeding position into the working position, the leading end 46 thereof initially enters the passageway 114 at an open axial end 119 thereof, extends along the axis 104 up to and beyond the input end 116 of the spindle 110, through the spindle 110 and from the output end 118 of the spindle 110 to be exposed adjacent to the tool assembly 112. The advancement of the piece 12 of bar stock can be effected by a pushing action through the feed assembly 26, as previously described with respect to claims 1–5, or by a feed assembly 26' which grips and pulls the pieces 12 of bar stock from the feeding position into the working position. The spindle 110 may be of any conventional construction.

Once in the working position, the active piece 12 of bar stock is held by the spindle 110 whereupon the appropriate machining operation is carried out by the tool assembly, as the spindle is rotated by a drive 120 around the axis 104, to produce the finished workpiece 22. The initial length of the pieces 12 of bar stock can be selected to allow fabrication of numerous of the workpieces 22 from each length thereof. Accordingly, after each machining operation, the feed assembly 26, 26' can be operated to advance the active piece 12 of bar stock a set distance as dictated by the length of the workpiece 22 to be formed.

According to the invention, the trailing end 44 of a piece 12 of bar stock is monitored to thereby determine whether the remaining length of the piece 12 of bar stock in the guide passageway 114 is sufficient to perform a desired operation thereon by the tool assembly 112.

To accomplish this, a first type of sensor assembly is shown at 121. The sensor assembly 121 includes a laser beam generator and receiver 122 which is capable of directing a laser beam at the trailing end 44 of a piece 12 of bar stock and receiving the reflected beam signal. With an appropriate control 124, an analysis of the impinging and reflecting beams can be made, after each advancing movement of the piece 12 of bar stock, to ascertain the distance D between the laser beam generator/receiver 122 and the trailing end 44 of the piece 12 of bar stock. For a predetermined distance D, the remaining length of the active piece 12 of bar stock will be insufficient to perform an operation to produce a desired workpiece configuration. Upon identifying this predetermined distance, or greater, the control 124 sends a stop signal 126 to a drive 128 for the tool assembly 112 and/or the drive 120 to thereby prohibit operation of the tool assembly 112 on the remaining piece 12 of bar stock. At the same time, or alternatively, the control 124 may send a signal 130 to the feed assemblies 26, 26' which may cause the feed assemblies 26, 26' to stop and/or reverse the direction of movement of the remaining piece 12 of bar stock.

In FIG. 9, an alternative form of sensor assembly is shown at 132. The sensor assembly 132 includes a drum 134 with a hub 136 around which a wire element 138 is wrapped. The wire element 138 has a free end 140 which can be advanced into the passageway 114 by rotation of the hub 136. The wire element 138 may be a single wire or a plurality of bundled wires. The wire may be spring wire, piano wire, or the like. The degree of rotation/number of rotations dictates the extension of the wire element 138 within the passageway 114 to allow calculation of the distance D1, which again is correlated to the length of the remaining piece 12 of bar stock.

The rotation of the hub 136 can be detected by a control 142. Upon sensing the number of revolutions of the hub 136 which extends the wire element to a distance D1 indicative that the length of the remaining piece 12 of bar stock is less than that necessary to produce the desired configuration for the workpiece 22, the control 142 generates a signal 144 to the drive 128 and/or one or both of the feed assemblies 26, 26', as previously described.

Figure 10:
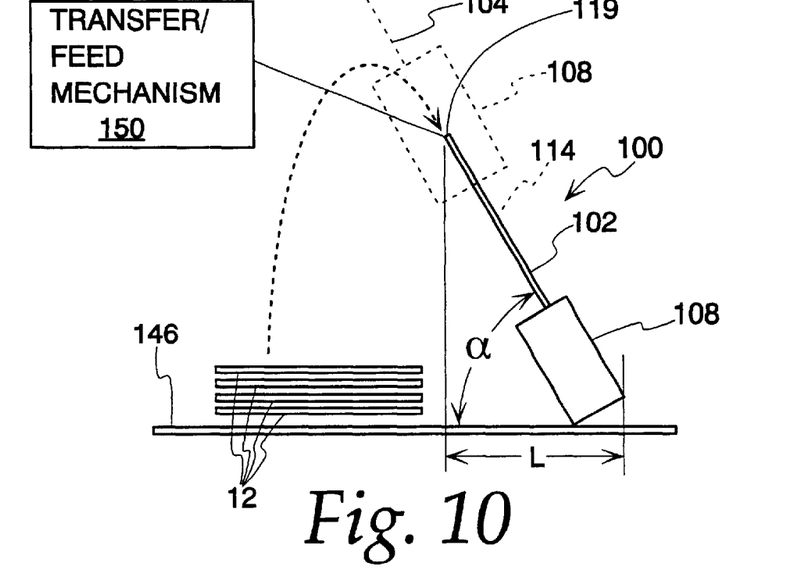
FIG. 10 is a schematic representation of a lathe system, according to the invention, and having a non-horizontal guide passageway for a supply of pieces of bar stock, with the individual pieces being deliverable one-by-one from a supply in which the elongate bar stock is situated horizontally.
Figure 11:
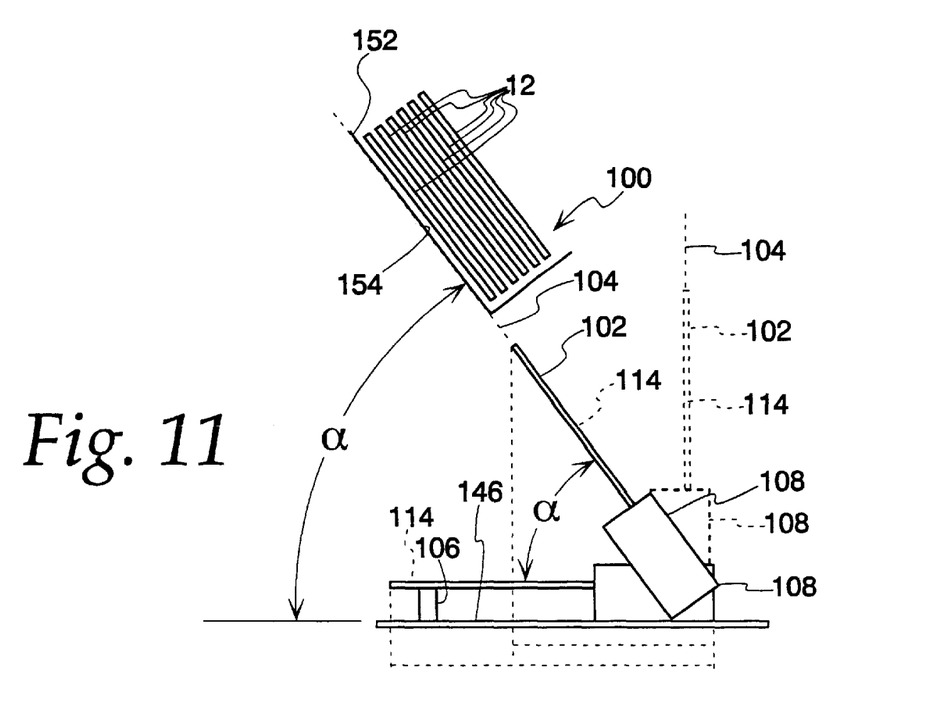
FIG. 11 is a view as in FIG. 10 with pieces of bar stock in a supply situated angularly to a horizontal support surface for the lathe assembly for facilitated delivery to the guide passageway, and with a modification of the lathe assembly shown in phantom wherein the guide assembly extends substantially orthogonally to a horizontal support surface for the lathe assembly.

In FIGS. 10 and 11, the guide 102 and frame element 108 are shown inclined from the orientation in FIGS. 6–9 relative to a horizontal support surface 146 for the lathe assembly 100. Whereas the central axis 104 is substantially parallel to the support surface 146 for the lathe assembly 100 in FIGS. 6–9, in FIGS. 10 and 11, the axis 104 makes an angle α to the support surface 146. The angle α may range from a few degrees to 90°, as shown in dotted lines in FIG. 11.

The effective length L occupied by the guide 102 and frame 108 is reduced from the length L1 (FIG. 6) with the lathe assembly 100 in the FIG. 6 orientation. Since many facilities in which the lathe assembly 100 would be operated have no significant height restriction, it is possible to reduce the operating area of the floor required for the lathe assembly 100 by angularly situating the guide 102 and housing 108 as in FIGS. 10 and 11.

In FIG. 10, the pieces 12 of bar stock are stacked so that the lengths thereof are substantially parallel to each other and the surface 146. Through an appropriate transfer/feed mechanism 150, individual pieces 12 of bar stock can be reoriented and directed into the passageway 114 through the open axial end 119 of the guide 102.

Alternatively, as shown in FIG. 11, a hopper 152 can be provided for a supply of the pieces 12 of bar stock. The hopper 152 has a guide surface 154 which is situated at an angle α equal to the angle α for the inclination of the guide 102 and frame element 108. Suitable structure can be provided to discharge the pieces 12 of bar stock one-by-one from the hopper 152 by movement along the guide surface 154.

A further modification is shown in phantom lines in FIG. 10 wherein the lathe assembly 100 is reversed so that the frame element 108 is above the guide 102. The individual pieces 12 of bar stock would thus have to be fed against gravitational forces to a working position. This arrangement may be practical at relatively small angles α and for relatively short pieces 12 of bar stock.

In FIGS. 14–17, a spindle 160 is shown in conjunction with a guide assembly 162 which allows the tool assembly at 164 to perform a machining operation on the piece 12 of bar stock held by the spindle 160 both unsupported, with the fixed spindle arrangement as shown for the lathe assembly 58, and supported with the sliding spindle arrangement, as shown for the lathe assembly 60. Typically, this type of lathe assembly is used to produce small diameter parts using bar stock on the order of ⅛–¼ inch as opposed to 3–4 inches for the lathe assembly 100.

Figure 14:
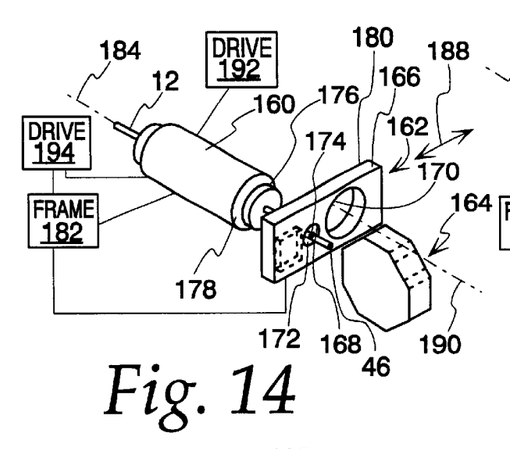
FIG. 14 is a perspective view of a spindle in relationship to a guide assembly, according to the invention, and a tool assembly, with the guide assembly and spindle being in a first relative position wherein a piece of bar stock held by the spindle is supported on a bushing on the guide assembly.

More specifically, the guide assembly has a body 166 with a mounting opening 168 and a second opening 170 therethrough. The mounting opening 168 has a bushing 172 fit therewithin and in turn has an opening 174 therethrough that is slightly greater in diameter than the diameter of the piece 12 of bar stock and of a lesser diameter than the second opening. The second opening 170 is dimensioned to snugly receive a reduced diameter portion 176 of the spindle 160. With the reduced diameter portion 176 extended into the second opening 170, an annular surface 178 abuts to a facing surface 180 on the body 166.

Figure 15:
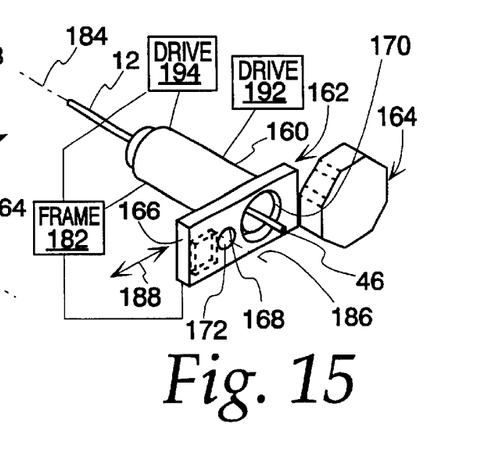
FIG. 15 is a view as in FIG. 14 with the spindle and guide assembly repositioned to a second relative position wherein the spindle abuts to the guide assembly and the piece of bar stock is not directly supported by the guide assembly.

According to the invention, the spindle 160 and body 166 are mounted to a frame 182 for guided movement between a first relative position, as shown in FIG. 14, and a second relative position as shown in FIG. 15. In the first relative position, the axis 184 of the spindle 160 extends through the opening 174 and is coincident with the central axis 186 of the opening 174 and the central axis of the piece 12 of bar stock held by the spindle 160. The bushing 172, which may be journalled for rotation relative to the body 166, supports the leading end 46 of the piece 12 of bar stock near the location where it is operated upon by the tool assembly 164.

By translatingly shifting one or both of the spindle 160 and body 166 relative to the frame 182, and each other, in the direction of the double-headed arrow 188, the spindle 160 and guide assembly 162 can be placed in the second relative position, wherein the central axis 184 extends through the opening 170 and coincides with the central axis 190 of the second opening 170. In the second relative position, the annular surface 178 can be abutted to the surface 180. The diameter of the second opening 170 is significantly greater than the diameter of the piece 12 of bar stock so that the spindle 160 can be rotated by a drive 192 without there being any interference between the piece 12 of bar stock and the body 166.

In the first relative position of FIG. 14, the spindle 160 and tool assembly 164 cooperate in the same manner as the spindle 76 and tool assembly 96 in FIG. 13. In the second relative position of FIG. 15, the spindle 160 and tool assembly 164 cooperate in the same manner as the tool assembly 62 cooperates with the tool assembly 72 in FIG. 12. Thus, it is possible to use a single spindle 160 and a single lathe assembly to operate in both modes disclosed in FIGS. 12 and 13.

A second drive 194 may also be used to move the spindle 160 relative to the frame 182 along the axis 184. Additionally, or alternatively, the guide assembly 162 can be moved in the same line relative to the frame 182 and spindle 160.

Figures 16, 18:
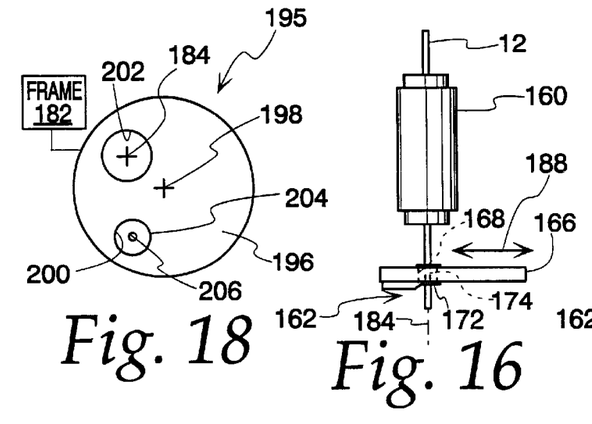
FIG. 16 is a fragmentary, plan view of the spindle and guide assembly, according to the invention, arranged to function as a fixed spindle lathe assembly as in FIG. 14.
FIG. 18 is an elevation view of a modified form of guide assembly that is useable in conjunction with the spindle in FIGS. 14–17.
Figure 17:
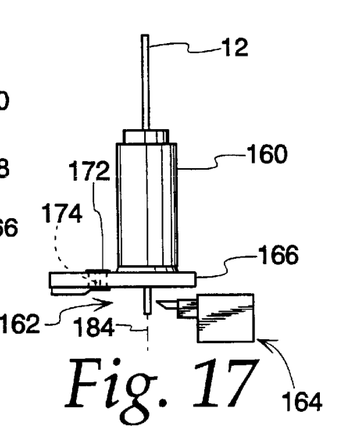
FIG. 17 is a fragmentary, plan view of the spindle and guide assembly, according to the invention, arranged to function as a sliding spindle lathe assembly as in FIG. 15.

In FIG. 18, a modified form of guide assembly 195 is shown having a body 196 which is rotatable around an axis 198 relative to the frame 182 and spindle 160 between corresponding first and second relative positions.

The body 196 has mounting and second openings 200, 202 therethrough. By rotating the body 196 about the axis 198, the openings 200, 202 can be repositioned so that the central axes thereof selectively can be brought into coincidence with the axis 184. The second opening 202 has the same diameter as the opening 170, with the mounting opening 200 having a corresponding diameter to the first opening 168. A like bushing 204 can be mounted in the opening 200 and in turn has an opening 206, corresponding to the opening 174, to accept the piece 12 of stock material.

The foregoing disclosure of specific embodiments is intended to be illustrative of the broad concepts comprehended by the invention.

What is claimed is:

1. A lathe assembly comprising:
   a spindle for holding an elongate workpiece and having a central axis;
   a guide assembly having a body and a guide bushing on the body having a first opening with a central axis,
   the spindle and guide assembly being selectively repositionable between a) a first relative position wherein the central axis of the spindle extends through the first guide bushing opening so that an elongate workpiece held by the spindle can be projected into the first guide bushing opening so that the guide bushing limits flexing of an elongate workpiece held by the spindle and b) a second relative position wherein the central axis of the spindle does not extend through the first guide bushing opening and extends through the guide assembly at a location spaced from the first guide bushing opening; and
   a tool assembly for performing an operation on an elongate workpiece held by the spindle with the spindle and guide assembly in each of the first and second relative positions.

2. The lathe assembly according to claim 1 wherein with the spindle and guide assembly in the first relative position the central axis of the spindle is substantially coincident with the central axis of the first guide bushing opening.

3. The lathe assembly according to claim 1 wherein the guide bushing is rotatable relative to the guide assembly body around the central axis of the first guide bushing opening.

4. The lathe assembly according to claim 1 in combination with an elongate workpiece that is held by the spindle and projects into the first guide bushing opening with the spindle and guide assembly in the first relative position.

5. The lathe assembly according to claim 1 wherein the guide assembly comprises a second opening in the body with a central axis, and with the spindle and the guide assembly in the second relative position the central axis of the spindle extends through the second opening.

6. The lathe assembly according to claim 5 wherein the first guide bushing opening has a first diameter, the second opening has a second diameter, and the first diameter is different than the second diameter.

7. The lathe assembly according to claim 5 wherein the guide assembly is translatable as one piece relative to the spindle as the spindle and guide assembly are repositioned between the first relative position and the second relative position.

8. The lathe assembly according to claim 5 wherein the guide assembly is rotatable as one piece about an axis relative to the spindle as the spindle and guide assembly are repositioned between the first relative position and the second relative position.

9. The lathe assembly according to claim 5 wherein with the spindle and the guide assembly in the second relative position the central axis of the spindle is substantially coincident with the central axis of the second opening.

10. The lathe assembly according to claim 1 wherein the spindle and guide assembly are movable, one relative to the other, along a line substantially parallel to the central axis of the spindle.

11. The lathe assembly according to claim 1 wherein the spindle is abuttable to the guide assembly to be supported by the guide assembly.

12. A lathe assembly comprising:
    a spindle for holding an elongate workpiece and having a central axis;

a guide assembly having a body and a first opening with a central axis, the spindle and guide assembly being selectively repositionable between a) a first relative position wherein the central axis of the spindle extends through the first opening so that an elongate workpiece held by the spindle can be projected into the first opening so that the guide assembly limits flexing of the elongate workpiece held by the spindle and b) a second relative position wherein the central axis of the spindle does not extend through the first opening and extends through the guide assembly at a location spaced from the first guide bushing opening; and a tool assembly for performing an operation on the elongate workpiece held by the spindle with the spindle and guide assembly in each of the first and second relative positions.

13. A method of performing operations on elongate workpieces held by a spindle that is rotatable around a central axis, said method comprising the steps of:

directing a first elongate workpiece held by the spindle through a first guide opening on a guide assembly so that the guide assembly limits flexing of the first elongate workpiece;

performing an operation on the first elongate workpiece held by the spindle;

relatively repositioning the spindle and guide assembly by moving the guide assembly as one piece relative to the spindle; and after relatively repositioning the spindle and guide assembly, performing another operation on one of a) the first elongate workpiece and b) a second elongate workpiece held by the spindle with the one of the first and second elongate workpieces passing through the guide assembly at a location spaced from first guide opening in the guide assembly.

14. The method of performing operations on elongate workpieces according to claim 13 wherein the guide assembly has a second opening and after relatively repositioning the spindle and guide assembly, the one of the first and second elongate workpieces passes through the second opening.

15. The method of performing operations on elongate workpieces according to claim 14 wherein the first and second openings each have a diameter and the diameter of the second opening is greater than the diameter of the first opening.

16. The method of performing operations on elongate workpieces according to claim 13 wherein the step of relatively repositioning comprises relatively repositioning the spindle and guide assembly along a plane orthogonal to the central axis.

17. The method of performing operations on elongate workpieces according to claim 16 wherein the step of relatively repositioning comprises rotating the guide assembly around an axis.

18. The method of performing operations on elongate workpieces according to claim 16 wherein the step of relatively repositioning comprises translating the guide assembly along a line.

19. The method of performing operations on elongate workpieces according to claim 13 wherein the step of performing an operation comprises performing an operation on an end of the first elongate workpiece that is passed through the guide assembly.

20. The method of performing operations on elongate workpieces according to claim 13 wherein the second elongate workpiece has a first diameter and the guide assembly has a second opening through which the second elongate workpiece passes at the location spaced from the first guide opening with a diameter substantially greater than the first diameter.

21. The method of performing operations on elongate workpieces according to claim 20 wherein the second elongate workpiece is unguided by the guide assembly with the second elongate workpiece passed through the second opening.

* * * * *